Feb. 3, 1959 J. W. STRANGE 2,872,567
INSTRUMENT PANEL ILLUMINATOR
Filed Dec. 20, 1955
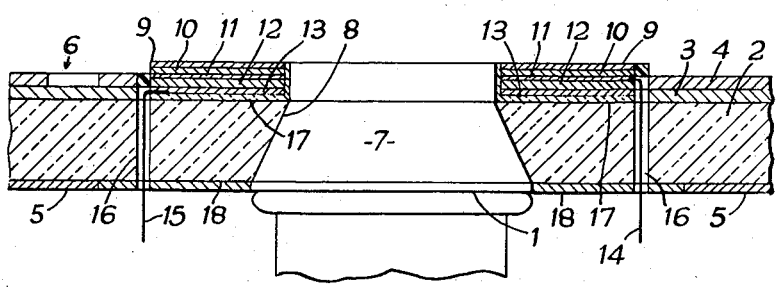
INVENTOR
John W<u>m</u> Strange
BY
Hall & Houghton
ATTORNEY

United States Patent Office 2,872,567
Patented Feb. 3, 1959

2,872,567

INSTRUMENT PANEL ILLUMINATOR

John William Strange, London, England, assignor to Thorn Electrical Industries Limited, London, England Application December 20, 1955, Serial No. 554,328

Claims priority, application Great Britain December 24, 1954

13 Claims. (Cl. 240—8.16)

The present invention relates to the illumination of surfaces of members, such as the surfaces of instrument dials, disposed in or behind a panel. A known example is an instrument dial arranged in an aperture in a trans-illuminated panel of light-transmitting material, such as clear methyl methacrylate polymer, the trans-illumination being produced by one or more incandescent filament "pea" lamps arranged in a further aperture or apertures respectively in the panel, the light from the lamp or lamps being transmitted by reflection or diffusion in directions generally parallel to the major surfaces of the panel.

Owing to the small size of such lamps they are relatively fragile and are also expensive. Moreover, such panels are most commonly used in aircraft, in which space is very limited, and difficulty is often experienced in accommodating the lamps and their holders in the space available. Further, it is difficult to avoid scattering of the light with the consequent loss in illumination and the possibility that light is directed toward an observer, which may result in distraction of the eye of the observer and a reduction in contrast.

An object of the present invention is to provide a new panel for the illumination of instrument dials and the like.

According to the present invention there is provided a panel for the illumination of a surface of a member, such as an instrument dial, the panel having an aperture for the reception of the member, at least the part of the panel in which the aperture is formed being of light-transmitting material, and the panel including an electroluminescent lamp disposed on the front surface of the panel at the edge of the aperture and arranged to direct the light emitted thereby into the panel.

An electroluminescent lamp comprises a pair of spaced conductive electrodes having disposed between them a light-producing layer of a material that is excited to luminescence upon the production of a suitable field between the electrodes. The lamp is, in effect, a luminescent capacitor, the electrodes constituting the plates thereof.

Preferably, the leads for feeding electric current to the electroluminescent lamp pass through the part of the panel surrounding the aperture.

Also, preferably the part of the rear surface of the panel opposite to the electroluminescent lamp is rendered non-reflecting, preferably by having applied thereto by a pressure moulding operation a layer of an opaque synthetic resin.

A preferred embodiment of the invention will now be described, by way of example, with reference to the accompanying diagrammatic drawing. In the drawing the thickness of the various layers are exaggerated and are not to scale for the sake of clarity.

A panel for the illumination of an instrument dial 1 comprises a sheet 2 of clear methyl methacrylate polymer having on its front surface a white light-transmitting layer 3 covered by a black opaque layer 4 and a white light-reflecting layer 5 on its rear surface. If part of the black apaque layer 4 is removed as at 6 then the corresponding part of the white light-transmitting layer is seen by an observer, illuminated by the light transmitted thereby from the panel.

The panel is provided with a circular aperture 7 of frusto-conical shape with the smaller diameter at the front surface, the angle of inclination of the side wall 8 of the aperture being about 30° to the normal. The instrument dial 1 is arranged in the aperture at about the level of the rear surface of the panel. An annular section of the black and white layers on the panel front face surrounding the aperture is removed and replaced by an electroluminescent lamp.

The electroluminescent lamp comprises a metal plate 9 of annular form providing a strong, rigid "base" upon which the lamp can be assembled. A light-reflecting layer 10 of high dielectric constant, comprising for example a white ceramic glaze or, as described in British patent application No. 34,324/53, finely powdered titanium dioxide with a suitable organic binder, is then applied over the plate 9. The lamp comprises three layers. A transparent conductive electrode 11 is formed on the face of the layer 10 nearer to the panel, the electrode being formed, for example, by exposing the annular surface while hot to stannic chloride vapour. An annular light-producing layer 12, comprising an electroluminescent material in fine powder form and enclosed in a transparent dielectric material such as a glass, is then applied over the said electrode 11. A suitable electroluminescent material is, for example, zinc sulphide activated with small amounts of copper, lead and manganese. Another conductive electrode 13 is formed on the face of the light-producing layer 12 nearer to the panel in the same manner as the first conductive electrode 11. Viewed from the panel 2 the layers 13, 12 and 11 thus constitute the first, second, and third of the three layers of the lamp. The opaque light-reflecting layer 10 ensures that the light emitted by the lamp is directed only into the panel. The leads 14 and 15 feeding electric current to the lamp electrodes 11 and 13 respectively are led through bores 16 in the panel and from the rear surface thereof to their respective electrodes. A layer 17 of a transparent ceramic material is applied over the electrode 13 to protect it.

An annular section of the white reflecting layer 5 on the panel rear face surrounding the aperture is removed and replaced by an annular opaque non-reflecting layer 18 formed by a layer of a black synthetic resin, e. g. a black vinyl resin, the opaque non-reflecting layer being applied by a pressure moulding operation to ensure the necessary intimate contact between the layer 18 and the panel surface. Such an arrangement is also described in British patent application No. 34,324/53.

Some of the light produced by the electroluminescent lamp will be transmitted through the panel in directions generally parallel to the major surfaces thereof and the lamp will therefore constitute a trans-illumination light source for other parts of the panel. Other electroluminescent lamps can of course be provided at other parts of the panel.

I claim:

1. A panel comprising an apertured body of light-transmitting material, and an electroluminescent lamp disposed on the front surface of the panel at the edge of the aperture to direct the light emitted thereby into the panel for the illumination of a member associated with the panel, the lamp including three layers, the first of said three layers being nearest the front face of the panel and being a light transmitting conductive electrode, the second of said three layers being a light producing layer of electroluminescent material intermediate the first and third of said three layers, and the third of said three layers being a conductive electrode superimposed on the said light producing layer.

2. A panel according to claim 1, further comprising leads for feeding electric current to the electroluminescent lamp, said leads passing through the part of the panel surrounding said aperture, and being connected to said first and third layers respectively.

3. A panel according to claim 1, at least a part of the rear surface of the panel opposite the electroluminescent lamp being non-reflective.

4. A panel according to claim 1, at least a part of the rear surface of the panel opposite the electroluminescent lamp being provided with a layer of opaque non-reflecting synthetic resin pressure molded to said surface.

5. A panel according to claim 1, said third layer being a light transmitting conductive layer superimposed on the light-producing layer and said panel further comprising an opaque layer covering said third layer.

6. A panel according to claim 5, at least a part of the rear surface of the panel opposite the electroluminescent lamp being provided with a layer of opaque non-reflecting synthetic resin pressure molded to said surface.

7. A panel according to claim 5, wherein a light reflective layer is interposed between the light-producing layer and said opaque layer.

8. A panel according to claim 5, at least a part of the rear surface of the panel opposite the electroluminescent lamp being non-reflective.

9. A panel according to claim 5, said panel having on a part of its rear surface a layer reflecting light into the panel, and having on a part of its rear surface opposite the electroluminescent lamp a layer of opaque non-reflecting synthetic resin pressure molded to said surface.

10. A panel according to claim 9, wherein a light reflective layer is interposed between the light-producing layer and said opaque layer.

11. A panel according to claim 1, said panel having on a part of its rear surface a layer reflecting light into the panel, and having a part of its rear surface opposite the electroluminescent lamp non-reflective.

12. A panel according to claim 1, the aperture in said panel being of frusto-conical shape with its smaller end at the front face of the panel.

13. A panel according to claim 12, said panel having on at least a part of the rear surface a layer reflecting light into the panel.

References Cited in the file of this patent
UNITED STATES PATENTS

| | | |
|---|---|---|
| 2,660,824 | Neugass | Dec. 1, 1953 |
| 2,695,354 | Neugass | Nov. 23, 1954 |
| 2,696,550 | Neugass | Dec. 7, 1954 |
| 2,721,808 | Roberts et al. | Oct. 25, 1955 |
| 2,728,870 | Gungle et al. | Dec. 27, 1955 |
| 2,733,367 | Gillson | Jan. 31, 1956 |